United States Patent [19] [11] 4,120,407
Baur et al. [45] Oct. 17, 1978

[54] SPACE-CONSERVATIVE APPARATUS WITH MECHANICAL MEMORY FOR HOLDING AND CATALOGING SHADOW MASKS

[75] Inventors: Leslie L. Baur, Glen Ellyn; Thaddeus J. Hajduk, Chicago, both of Ill.

[73] Assignee: Zenith Radio Corporation, Glenview, Ill.

[21] Appl. No.: 813,048

[22] Filed: Jul. 5, 1977

[51] Int. Cl.[2] ........................ B65G 57/30; B65G 59/06
[52] U.S. Cl. .............................. 214/6 BA; 214/6 DK; 214/8.5 A; 214/8.5 K
[58] Field of Search ............. 214/6 DK, 8.5 K, 6 BA, 214/8.5 A, 8.5 H, 6 R, 8.5 R

[56] References Cited

U.S. PATENT DOCUMENTS 1,076,447 10/1913 Pindstofte ..................... 214/6 BA X

FOREIGN PATENT DOCUMENTS 2,229,254 1/1972 Fed. Rep. of Germany ....... 214/6 BA

*Primary Examiner*—Albert J. Makay
*Assistant Examiner*—George F. Abraham
*Attorney, Agent, or Firm*—John H. Coult

[57] ABSTRACT

This disclosure depicts shadow mask storage apparatus for use in the manufacture of television picture tubes and, specifically, for use with screening apparatus for screening picture tube faceplates. The apparatus has a mechanical memory for holding and cataloging shadow masks uniquely paired with the faceplates while the faceplates are being screened. The apparatus includes a plurality of mask holders which follow a cycle of being bottom loaded upward onto a stack of ascending mask holders, ratcheted upwards, rotated to a stack of descending mask holders, ratcheted downward, removed downward from the bottom of the stack of descending mask holders, rotated to a predetermined load/unload position, and rotated to the bottom of the stack of ascending mask holders. The apparatus insures in a fool-proof way that a one-to-one relationship is retained between the faceplates and the shadow masks when the faceplates are separated from the shadow masks and insures that excessive handling of and the possibility of damage to the shadow masks is prevented.

2 Claims, 13 Drawing Figures

SPACE-CONSERVATIVE APPARATUS WITH MECHANICAL MEMORY FOR HOLDING AND CATALOGING SHADOW MASKS

BACKGROUND OF THE INVENTION

This invention relates in general to the manufacture of color television picture tubes and in particular, to an space-conservative apparatus with mechanical memory for holding and cataloging shadow masks associated with faceplates of the television picture tubes while the faceplates are being screened. Conventionally, a color television picture tube has a glass bulb including a funnel and a flanged faceplate sealed to the flared end of the funnel. The faceplate has a concave inner surface on which is deposited an electron excitable phosphor screen. A shadow mask of substantially the same size as the inner surface of the faceplate is fastened to the faceplate in close adjacency to the inner surface.

Conventionally, the phosphor screen is formed on the inner surface of the faceplate in the following manner. First a light-absorptive grill is formed on the inner surface of the faceplate. To form this grill a coating of polyvinyl alcohol is evenly applied to the inner surface after which the coating is exposed through the shadow mask by a light source in a lighthouse. Three exposures are made corresponding to the positions of the red, green and blue phosphor elements. The unexposed PVA is removed from the inner surface of the faceplate leaving a pattern of hardened elements. The inner surface is then coated with a light absorptive material. The hardened PVA elements are removed from the inner surface leaving a pattern of openings in the light-absorptive material. The inner surface is next coated with a slurry of green phosphor material. The same shadow mask is replaced on the faceplate and the faceplate and shadow mask are placed in a lighthouse where the green phosphor elements are exposed. The remaining unexposed green phosphor slurry is removed from the faceplate leaving a pattern of green phosphor elements in the proper openings in the grill on the faceplate inner surface. The shadow mask is removed from the faceplate and the blue phosphor slurry is applied to the inner surface. The same shadow mask is again replaced on the faceplate and the blue phosphor slurry is exposed on the lighthouse and the unexposed blue phosphor slurry is then removed from the inner surface. Likewise, the red phosphor slurry is applied and exposed. The inner surface of the faceplate then has the complete phosphor screen disposited on it. It is important to note that the faceplate and shadow mask must be joined together and separated a number of times, and that the shadow mask must be stored while the phosphor slurries are applied to the faceplate. Since a particular shadow mask was used to form a pattern of openings on the inner surface of the faceplate in the grill, it is necessary due to the close tolerances involved to replace the same shadow mask onto the faceplate after the grill has been formed as well as after the phosphor slurries have been applied. This necessitates that a one-to-one correspondence between each faceplate and shadow mask be maintained at all times. Also the shadow mask being fragile must be protected against excessive handling and impurities while it is detached from the faceplate and awaiting reassembly.

Conventionally, the faceplate of a color television picture tube moves through a phosphor coating machine where the phosphor slurry is applied to the inner surface in various steps. While the faceplate moves through the phosphor coating machine, the corresponding shadow mask rides or hangs from a conveyor belt above the faceplate either within the machine or above the machine. Therefore, the faceplate and corresponding shadow mask are always together and no confusion can come about in attaching a shadow mask to its proper faceplate. Several disadvantages are present in this type of system. The mask may be damaged or its tiny perforations clogged by its being in close proximity to the machinery which coats the faceplate with the phosphor slurry. In addition, the conveyor belt carrying the shadow mask requires a significant amount of space within the factory and also is expensive.

U.S. Pat. No. 3,912,963 issued to Sedivy, and assigned to the same assignee as the present application, discloses a unique type of faceplate and shadow mask. The faceplate has no flange and the shadow mask is supported directly on the faceplate by a mask suspension system comprising four mask suspension devices, one located at each corner of the mask. This permits the mask to be quickly and precisely mounted on the faceplate. This unique type of shadow mask has no frame and is flexible so that it may conform to any minor deviations in the inner surface of the faceplate. As a result, however, the shadow mask is delicated and easily damaged by excessive handling or exposure to impurities in the atmosphere. The novel apparatus of this invention for use in holding and cataloging the shadow masks while the faceplates are being screened is applicable to the standard type of shadow mask as well as the unique time of frameless shadow mask described above.

OBJECTS OF THE INVENTION

It is a general object of the present invention to provide a space-conservative apparatus with mechanical memory for holding and cataloging shadow masks for color television picture tubes while faceplates of the picture tubes are being screened.

It is another object of the present invention to provide an apparatus which insures in a foulproof way that a one-to-one relationship is retained between the faceplates and the shadow masks which are separated from the faceplates during manufacture of the color television picture tubes.

It is still another object of the present invention to provide an apparatus which is capable of protecting the shadow masks for color television picture tubes during manufacture and prevent excessive handling and the possibility of damage.

It is yet another object to provide an apparatus for holding and cataloging the shadow masks which takes up a minimum amount of floor space within a factory.

It is another object to provide an apparatus for holding and cataloging shadow masks which is simple, reliable and inexpensive.

BRIEF DESCRIPTION OF THE DRAWINGS

The features of the present invention which are believed to be novel are set forth with particularity in the appended claims. The invention, together with further objects and advantages thereof may best be understood by reference to the following description taken in conjunction with the accompanying drawings, in the several figures of which like reference numerals identify like elements, and in which:

DESCRIPTION OF THE PREFERRED EMBODIMENT

Figure 1:
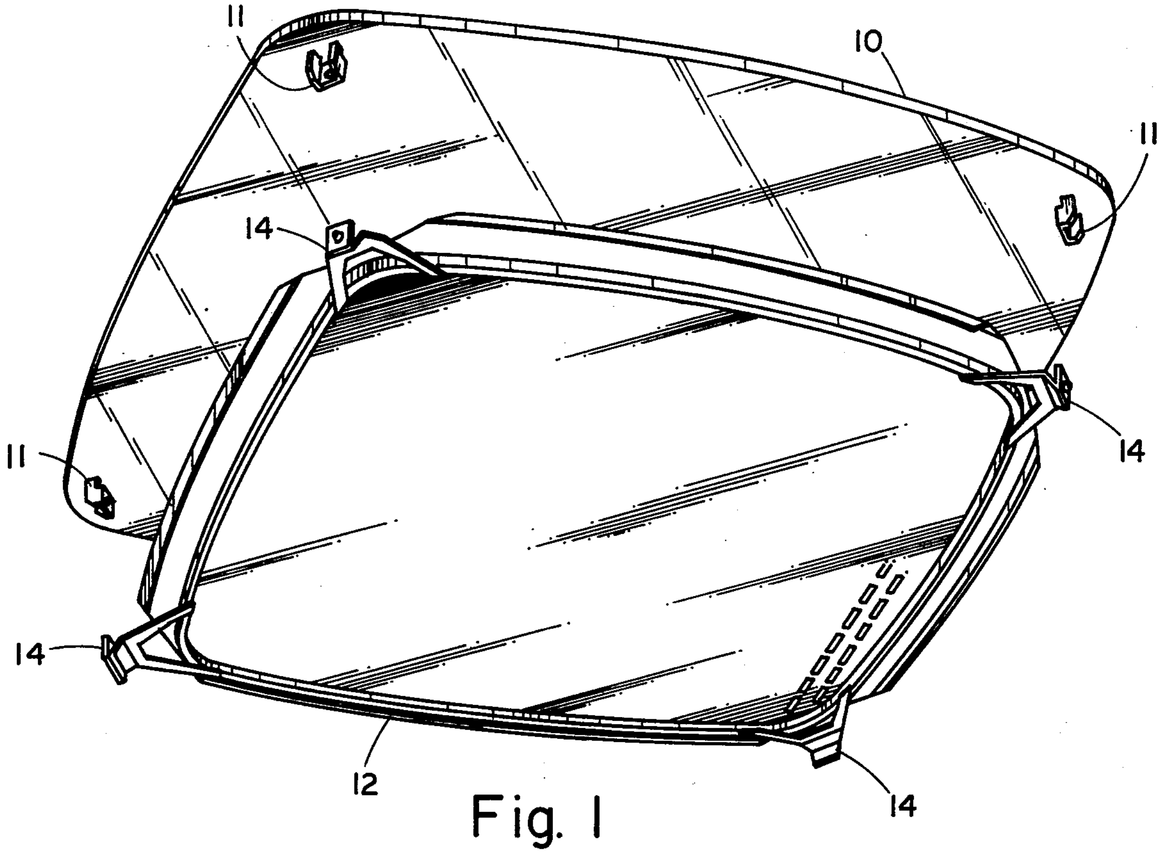
FIG. 1 is a perspective view of a flangeless faceplate and a frameless shadow mask.

This invention pertains to a space conservative apparatus with mechanical memory for use in the manufacture of television picture tubes and, specifically, for use with an n station screening apparatus for screening picture tube faceplates. The novel apparatus is used for holding and cataloging shadow masks associated with the faceplates while the faceplates are being screened. Whereas the invention may be used in the manufacture of various types of color television picture tubes, it is know to be useful in the manufacture of a tube having a flangeless faceplate and a frameless shadow mask of the nature shown in FIG. 1. The faceplate 10 has a stud 11 located in each corner of the faceplate 10 for attaching a shadow mask 12. The shadow mask 12 has a mask suspension device 14 located on each corner of the mask 12 which mates with the studs 11. This mask suspension system is disclosed in U.S. Pat. No. 3,912,963 issued to Sedivy and assigned to the same assignee as the present application. The shadow mask 12 has no frame and is torsionally flexible so that it may conform to any minor deviations in the faceplate 10.

Figure 2:
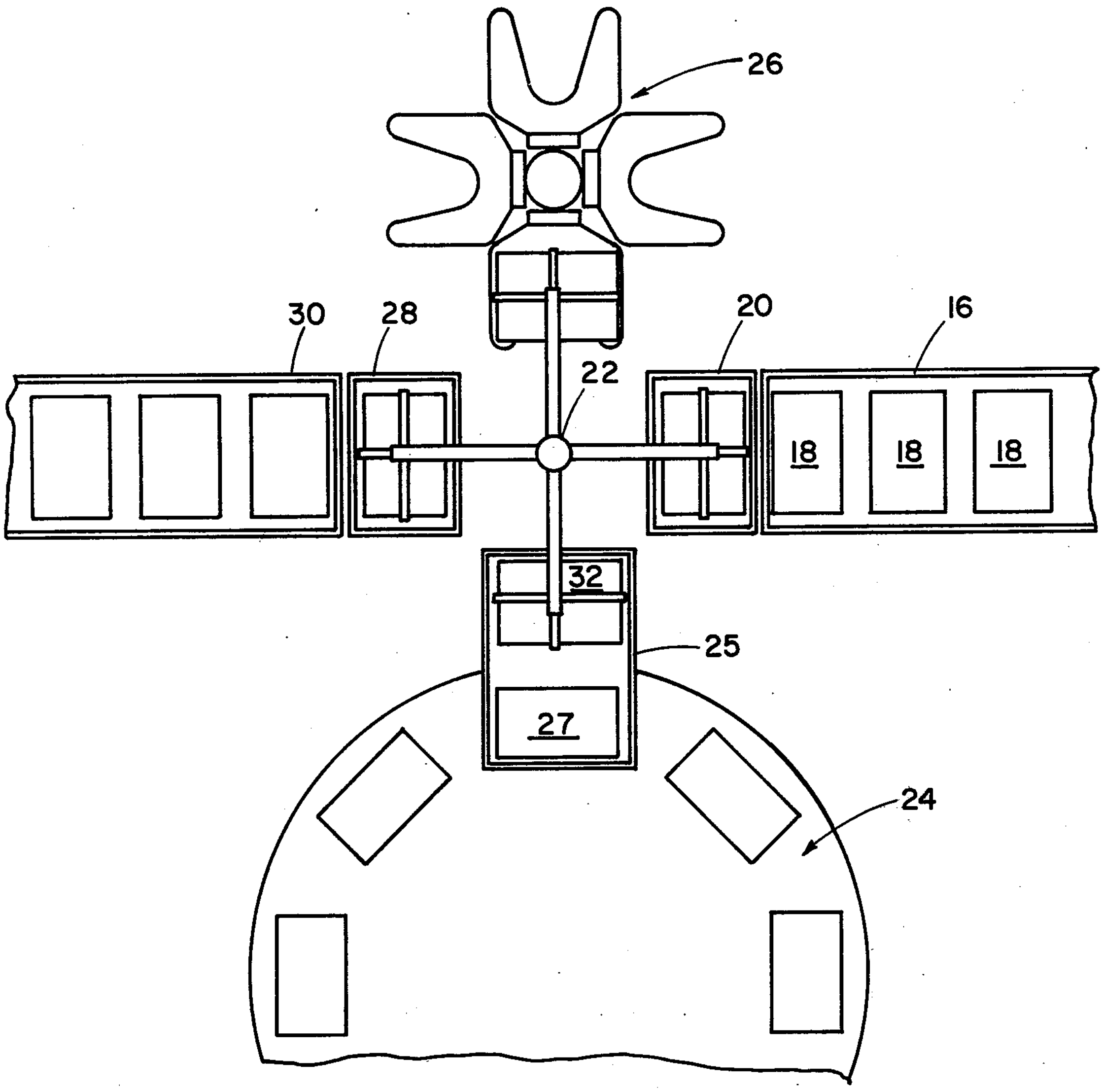
FIG. 2 schematically depicts an n station phosphor screen machine and associated machinery for loading and unloading faceplates to the screening machine, and a novel apparatus used for holding and cataloging the shadow mask during the time the faceplates are screened.

FIG. 2 schematically illustrates screening machines used in a factory for forming an electron excitable phosphor screen on the inner surface of a faceplate. A mask and faceplate translocating device 16 brings assembled faceplates and masks 18 from a grill forming machine (not shown) or a previous screening stage. Each of the assembled faceplates and masks 18 are placed one at a time on a mask inserter remover machine 20. This machine 20 separates the shadow masks from the faceplates. A mask and faceplate transfer machine 22 places the separated faceplate onto a loader 25 and places the corresponding shadow mask on the novel space-conservative apparatus 26 with mechanical memory for holding and cataloging the shadow masks while the faceplates are being screened. The loader 25 exchanges the faceplate just placed on it with a finished faceplate at location 27 in a phosphor coating machine 24. The faceplates in the phosphor coating machine 24 proceed through a series of steps where a phosphor slurry is applied to the inner surface of the faceplates. When this process is completed, and the loader 25 has removed a faceplate from the phosphor coating machine 24, the mask and faceplate transfer machine 22 removes the faceplates from the loader 25 and removes the corresponding shadow mask from the novel apparatus 26. The mask and faceplate transfer machine 22 first places the shadow mask onto a second mask inserter-remover machine 28, and then places the corresponding faceplate on the second mask inserter-remover machine 28. The machine 28 then assembles the mask with the faceplate and a second mask and faceplate translocating device 30 removes the assembled faceplate and shadow mask from the second mask inserter-remover machine 28, and takes the assembled shadow mask and faceplate to the next stage of manufacture.

In this particular factory set-up the phosphor coating machine 24 has "$n$" stations while the novel apparatus 26 for holding and cataloging the shadow masks has "$n+1$" stations. This is due to the fact that a faceplate disassembled from a shadow mask is placed into a first position 32 on the loader 25 before entering the phosphor coating machine 24. Obviously, the faceplates could be placed directly into the phosphor coating machine. There would then be n stations in the phosphor coating machine 24 and n stations on the novel apparatus 26.

Figure 3:
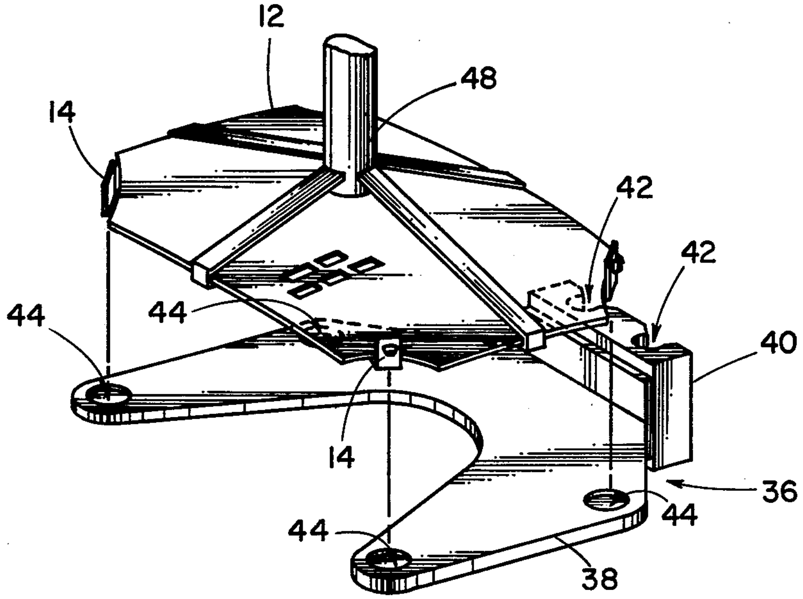
FIG. 3 is a perspective view of a mask holder used on the novel apparatus and of a frameless shadow mask.

FIG. 3 shows a perspective view of a mask holder 36 of the novel apparatus 26. The mask holder 36 comprises a platen 38 which is attached to a guide block 40. The guide block has a pair of sleeves 42 which slide on guide rods which will be described later. The platen 38 has four recesses 44 within its upper surface 46 for receiving the four mask suspension devices 14 on the shadow mask 12. A claw-like mechanism 48 which is part of the mask and faceplate transfer machine 22, holds the shadow mask 12 on its sides and once the shadow mask 12 is placed on the platen 38, the shadow mask 12 is released by the claw-like mechanism 48. The recesses 44 in the platen 38 prevent the shadow mask 12 from slipping off the platen 38 as the mask holder 36 is moved by the novel apparatus 26.

The novel apparatus is for use in the manufacture of television picture tubes and, specifically, for use with an $n$ station screening apparatus for screening picture tube faceplates. The space-conservative apparatus with mechanical memory for holding and cataloging shadow masks associated with the faceplates while the faceplates are being screened comprises: a plurality of mask holders in the quantity $n+1$; a support column supporting said mask holders and having a first means for ratcheting upward a stack of ascending mask holders and a second gravity-assisted means for ratcheting downward a stack of descending mask holders; an up and down reciprocating lower transfer turret supported on the lower end of the support column for removing downward one-at-a-time the mask holders from the bottom of the stack of descending mask holders, for rotating the mask holders to a first position wherein the masks are placed upon and/or removed from the mask holders, for rotating the mask holders to a second position below the stack of ascending mask holders, and for bottom loading upward the mask holders one-at-a-time onto the bottom of the stack of ascending mask holders; an upper transfer turret supported on the upper end of the support column for rotating the mask holders from the top of the stack of ascending mask holders to the top of the stack of descending mask holders; whereby the mask holders follow a cycle of being bottom loaded upward onto the stack of ascending mask holders, ratcheted upwards, rotated to the stack of descending mask holders, ratcheted downward, removed downward from the bottom of the stack of descending mask holders, rotated to a predetermined load/unload position, and rotated to the bottom of the stack of ascending mask holders; whereby the apparatus insures in a foolproof way that a one-to-one relationship is retained between the faceplates and the shadow masks when the faceplates are separated from the shadow masks and insures that excessive handling of and the possibility of damage to the shadow masks is prevented.

Figure 4:
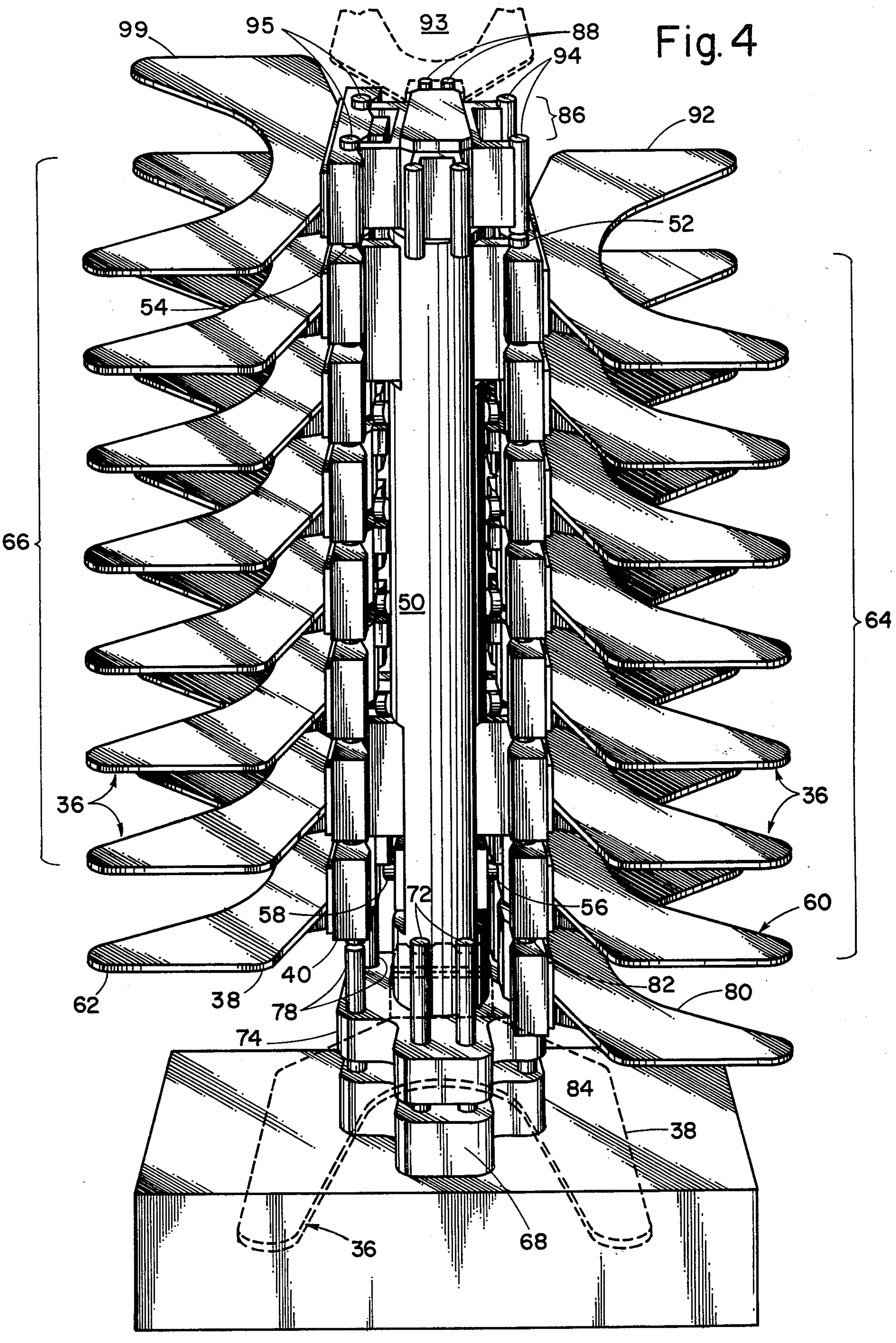
FIG. 4 is a perspective view of the novel apparatus of the present invention.
Figure 5:
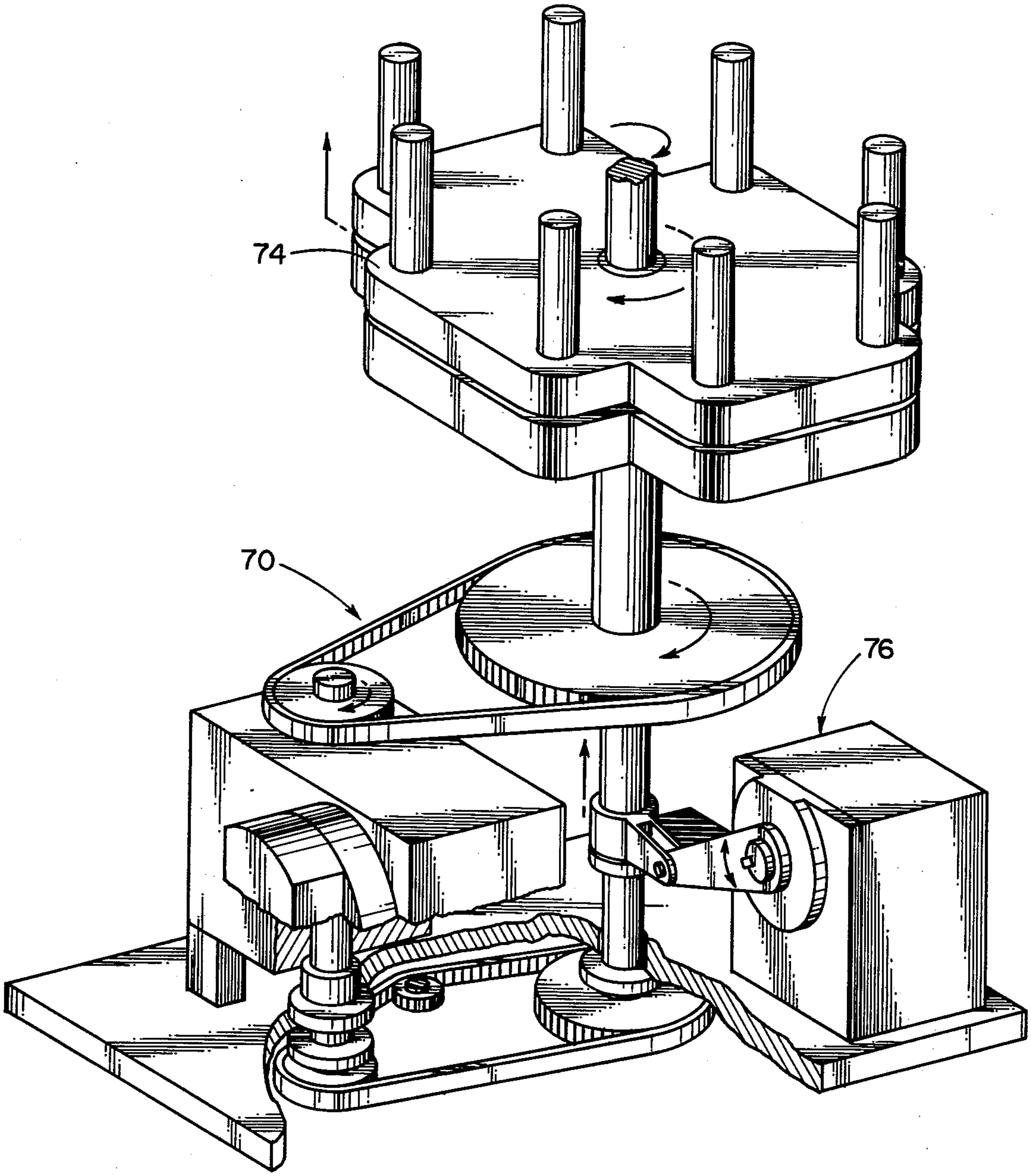
FIGS. 5 and 6 are perspective views of the novel apparatus for holding and cataloging shadow masks and show the sequence of movements of the shadow mask while the apparatus is operating.

The novel apparatus is illustrated in FIGS. 4 and 5 and will now be described in detail. As described above, each of the mask holders 36 have a horizontal platen 38 for holding the shadow mask 12 and a guide block 40 attached to the platen 38. The guide block 40 has a pair of vertical sleeves 42. A support column 50 has, angularly spaced therefrom, a pair of vertical ascending guide rods 52 and a pair of vertical descending guide rods 54. The sleeves 42 and the guide blocks 40 of the mask holders 36, slide over the ascending and descending guide rods 52 and 54. The support column 50 also has ascending and descending locking pins 56 and 58 at its lower end for engaging the guide blocks 40 of the mask holders 36. A mask holder 60 engaged by the ascending locking pin 56 supports a stack 64 of mask holders 36 on the ascending guide rods 52. Likewise a second mask holder 62 engaged by the descending locking pin 58 supports a stack 66 of mask holders 36 on the descending guide rods 54. The disengaging of the descending locking pin 58 from a lowermost holder 62 causes the stack 66 of descending mask holders 36 to ratchet downward by gravity assistance. The bottom loading of the stack 64 of ascending mask holders 36 causes the stack 64 of ascending mask holders 36 to ratchet upwards.

An up and down reciprocating lower transfer turret 68 is supported on the lower end of the support column 50 and linked to a rotating index drive mechanism 70 for rotating the lower turret 68 about its central axis. The lower turret has four sets of vertical holding rods 72, 78, 82, diametrically opposed for engaging the sleeves 42 on the mask holders 36 and also for aligning with the lower ends of the ascending and descending guide rods 52, 54. The lower transfer turret also has an elevator block 74 for riding on the holding rods 72. The elevator block is linked to a reciprocating drive mechanism 76 for moving the elevator block 74 up and down a predetermined distance. The reciprocating drive mechanism 76 is also linked to the descending locking pin 58 on the support column 50. The raising of the elevator block 74 causes the descending blocking pin 58 to disengage a guide block 40 of the lowermost mask holder 62 on the descending guide rods 54. The lowermost mask holder 62 thereby drops down onto a first set 78 of holding rods 72 as the elevator block 74 is lowered thereby causing the stack 66 of descending mask holders 36 to ratchet downward.

Simultaneously, the raising of the elevator block 74 causes a first mask holder 80 to move up and off of a second set 82 of the holding rods 72 and onto the bottom of the ascending guide rods 52, thereby causing the stack 64 of ascending mask holders 36 to ratchet upward. The ascending locking pin 64 engages the guide block 40 of the first mask holder 80 preventing the first mask holder 80 from moving down off the ascending guide rods 52 as the elevator block 74 is lowered. When the elevator block 74 is in its lowered position having removed the lowermost mask holder 62 from the descending guide rods 54, the lower turret 68 is rotated to a predetermined position 84 between the ascending and descending guide rods 52, 54 to allow a mask to be placed upon and/or removed from the platen 38 of a mask holder 36.

An upper transfer turret 86 is supported on the upper end of the support column 50 and is linked to the rotating index drive mechanism 70 for rotating the upper turret 86 about its central axis. The upper turret 86 has four sets of vertical holding rods 88 for engaging the sleeves 42 on the mask holders 36 and also for aligning with the upper ends of the ascending and descending guide rods 52, 54. The upper turret 86 also has a holding pin for each set of the upper holding rods 88 for engaging the guide blocks 40 on the mask holders 36. The ratcheting upward of the stack 64 of ascending mask holders 36 causes an uppermost mask holder 92 to move off of the ascending guide rods 52 and onto a first set 94 of the holding rods 88. A corresponding first holding pin engages the guide block 40 of the uppermost mask holder 92 and prevents the mask holder 92 from dropping downward. The ratcheting downward of the stack 66 of descending mask holders 36 causes a second holding pin to disengage the guide block 40 of a second mask holder 99 above the stack 66 of descending mask holders 36 causing the second mask holder 99 to move downward off of a second set 95 of upper holding rods 90 and onto the top end of the descending guide rods 54. The rotating of the upper turret 86 causes the mask holders 36 to be rotated from a position above the upper end of the ascending guide rods 52 to an intermediate position 93 between the ascending and descending guide rods 52, 54 and then to the position above the upper end of the descending guide rods 54.

The rotating of the rotating index drive mechanism 70 and the up and down movement of the reciprocating drive mechanism 76 causes the mask holders 36 to follow a cycle of being bottom loaded onto the ascending guide rods 52, ratcheted upward, rotated to the descending guide rods 54, top loaded onto the descending guide rods 54, ratcheted downward, removed from the bottom of the stack 66 of the descending mask holders 36, rotated to a predetermined load/unload position 34, and rotated to the bottom of the ascending guide rods 52.

Figure 6A:
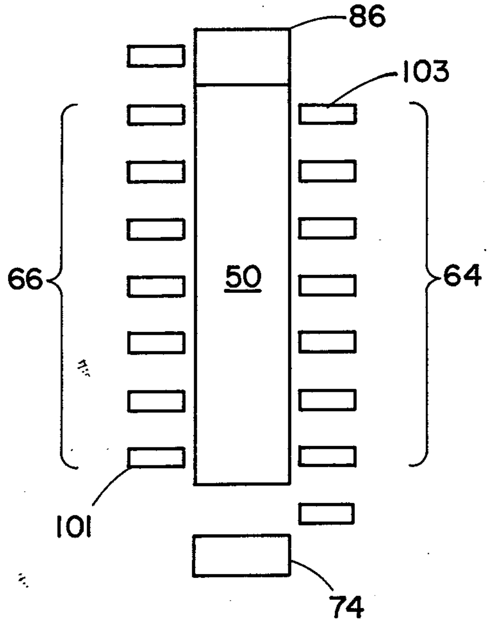
Figure 6B:
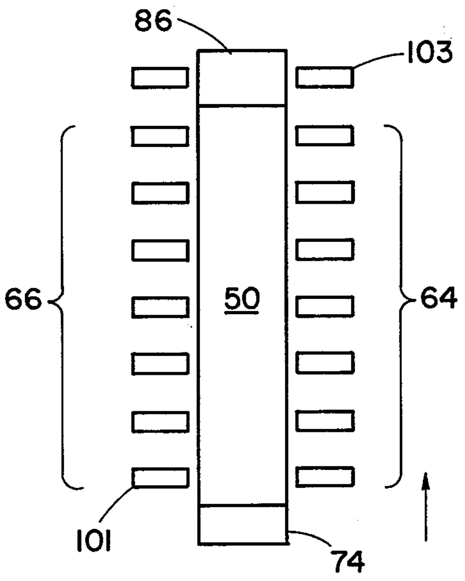
Figure 6C:
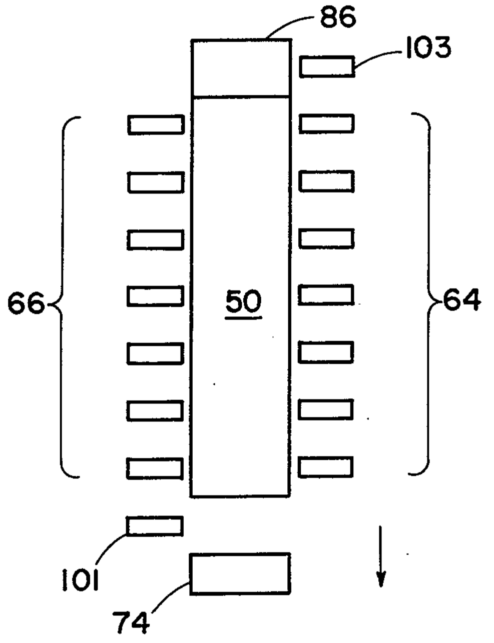
Figure 6D:
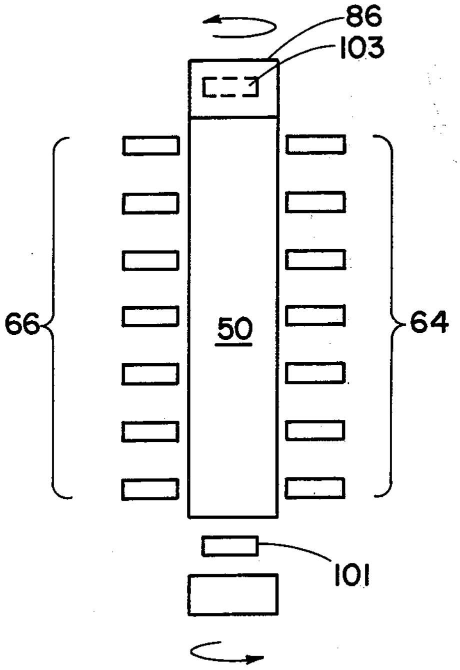
Figure 6E:
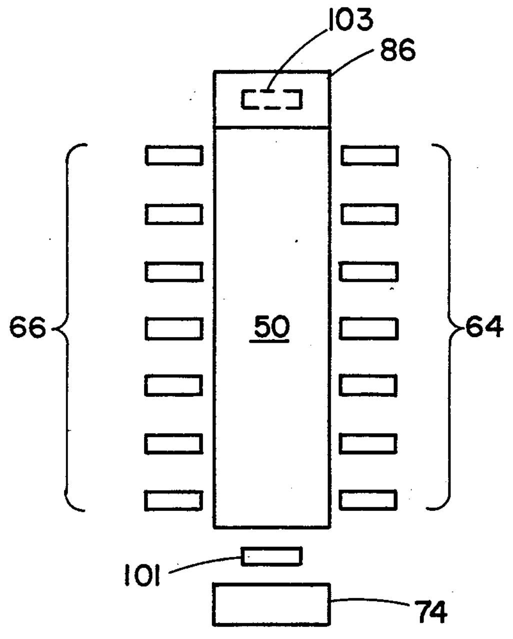
Figure 6F:
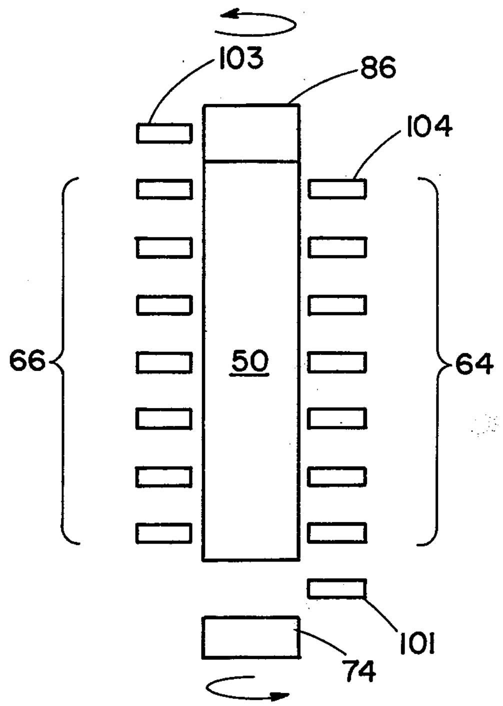
Figure 6G:
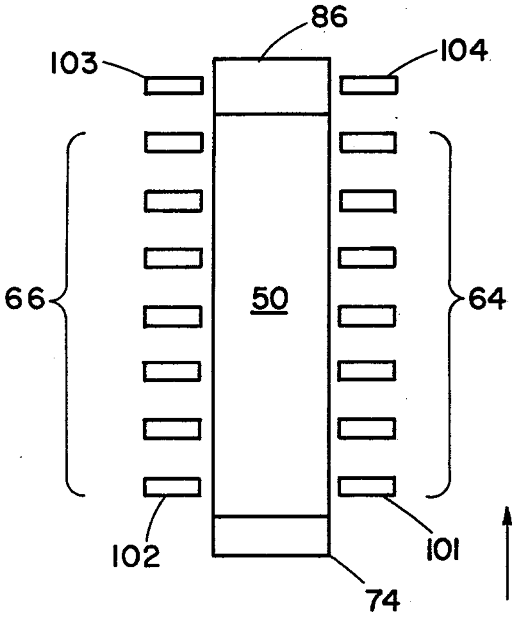
Figure 6H:
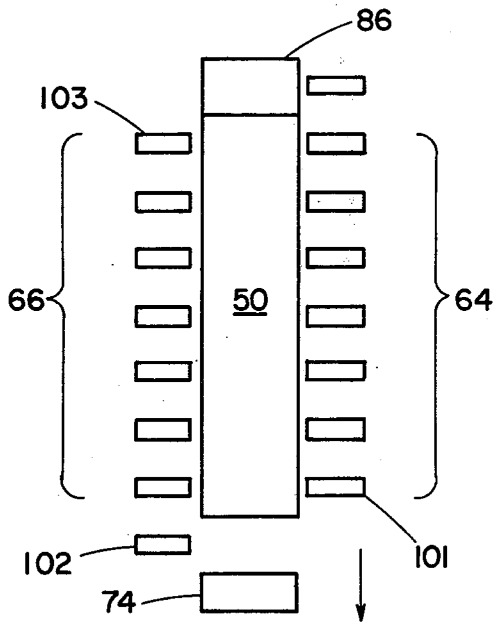

The sequence of movements of the mask holders as they traverse the novel apparatus is more clearly illustrated in FIGS. 6A to 6H. In these figures a mask holder 101 will be moved from the descending guide rods 54 to the ascending guide rods 52. FIG. 6A shows the apparatus 26 having a first mask holder 101 in the bottom-most position of the stack 66 of descending mask holders. In FIG. 6B the elevator block 74 of the lower reciprocating transfer turret 68 has moved upward, thereby disengaging descending locking pins 58 from the guide block of the mask holder 101. In FIG. 6C the elevator block 74 has been lowered dropping down the first mask holder 101 onto the holding rods 72. In FIG. 6D the lower transfer turret 68 has rotated 90° to bring the first mask holder 101 to the load/unload position. FIG. 6E illustrates that the machine now pauses while a shadow mask may be removed from and/or placed upon mash holder 101. After a mask is placed on the mask holder 101, the lower transfer turret 68 rotates another 90° positioning mask holder 101 beneath the ascending guide rods 52 as shown in FIG. 6F. In FIG. 6G the elevator block 74 of the lower transfer turret 68, moves upward causing the first mask holder 101 to move off of the holding rods 72 and onto the bottom of the ascending guide rods 52, thereby causing the stack 64 of ascending mask holders to ratchet upward. Simulateneously, descending locking pin 58 disengages the guide block of a second mask holder 102 and when the elevator block 74 is lowered (FIG. 6H) the second mask holder 102 moves down off of the descending guide rods 54 and onto the vertical holding rods 72 of the lower transfer turret 68. Ascending locking pin 56 now holds the first mask holder 101 in the bottom-most position of the stack 64 of ascending mask holders.

FIGS. 6A to 6H also illustrate how the mask holders are transferred from the top of the ascending rods 52 to the top of the descending guide rods 54 by the upper transfer turret 86. In FIG. 6A mask holder 103 occupies the uppermost position in the stack 64 of ascending mask holders. In FIG. 6B the elevator block 74 of the reciprocating lower transfer turret 68 is raised causing the stack 64 of ascending mask holders to ratchet upwards, thereby causing mask holder 103 to move up off of the ascending guide rods 52 and onto the vertical holding rods 88 of the upper transfer turret 86. A first holding pin engages guide block 40 of the mask holder 103 preventing the mask holder 103 from dropping down onto the ascending guide rods 52 when the elevator block 74 is lowered, as illustrated in FIG. 6C. In FIG. 6D the upper and lower transfer turrets 68 and 86 have rotated 90°. In FIG. 6E the apparatus 26 is in a pause position to allow a mask to be placed upon and/or removed from the mask holder 101 causing mask holder 103 to wait in a position intermediate the ascending and descending guide rods 52, 54. In FIG. 6F the lower and upper transfer turrets 68 and 86 have rotated another 90° bringing mask holder 103 into a position above the descending stack 66 of descending mask holders. In FIG. 6G the elevator block 74 of the lower transfer turret 68 has moved upward causing the stack 64 of ascending mask holders to ratchet upwards and thereby causing mask holder 104 to move up off of the ascending guide rods 52 and onto the vertical holding rods 72 of the upper transfer turret 86. A second holding pin engages the guide block of the mask holder 104 preventing the mask holder 104 from dropping down off of the holding rods 72. At the same time, the first holding pin is disengaged from the guide block of mask holder 103, thereby allowing the mask holder 103 to drop down off of holding rods 88 and onto the top end of the descending guide rods 54 when the elevator block 74 is lowered (FIG. 6H), removing a mask holder from the bottom of the stack 66 of the descending mask holders.

The invention is not limited to the particular details of the apparatus depicted and other modifications and applications are contemplated. Certain changes may be made in the above-described apparatus without departing from the true spirit and scope of the invention herein involved. It is intended, therefore, that the subject matter in the above depiction shall be interpreted as illustrative and not in a limiting sense.

What is claimed is:

1. For use in the manufacture of television picture tubes, and specifically for use with an n-station screening apparatus for screening picture tube faceplates, a space-conservative apparatus with mechanical memory for holding and cataloging shadow masks uniquely paired with said faceplates while said faceplates are being screened, said apparatus comprising:

a plurality of mask holders in the quantity $n+1$;

a support column supporting said mask holders and having a first means for ratcheting upward a stack of ascending mask holders and a second, gravity-assisted means for ratcheting downward a stack of descending mask holders;

an up and down reciprocating lower transfer turret supported on the lower end of said support column for removing downward one-at-a-time said mask holders from the bottom of said stack of descending mask holders, for rotating said mask holders to a first position wherein masks are placed upon and/or removed from said mask holders, for rotating said mask holders to a second position below said stack of ascending mask holders, and for bottom loading said mask holders upward one-at-a-time onto said bottom of said stack of ascending mask holders;

an upper transfer turret supported on the upper end of said support column for rotating said mask holders from the top of said stack of ascending mask holders to the top of said stack of descending mask holders;

whereby said mask holders follow a cycle of being bottom loaded onto said stack of ascending mask holders, ratcheted upwards, rotated to said stack of descending mask holders, ratcheted downward, removed downward from the bottom of said stack of descending mask holders, rotated to a predetermined load/unload position and rotated to the bottom of said stack of ascending mask holders;

whereby said apparatus insures in a foolproof way that a one-to-one relationship is retained between said faceplates and said shadow masks when said faceplates are separated from said shadow masks and insure that excessive handling of and the possibility of damage to said shadow masks is prevented.

2. For use in the manufacture of television picture tubes, and specifically for use with an *n*-station screening apparatus for screening picture tube faceplates a space-conservative apparatus with mechanical memory for holding and cataloging shadow masks uniquely paired with said faceplates while said faceplates are being screened, said apparatus comprising:

a plurality of mask holders in the quantity, $n+1$, each having a horizontal platen for holding said mask and a guide block attached to said platen, said guide block having a pair of vertical sleeves;

a support column supporting said mask holders and having a pair of vertical ascending guide rods and, angularly spaced therefrom a pair of vertical descending guide rods, wherein said sleeves in said guide blocks of said mask holders slide over said ascending and descending guide rods, said support column also having ascending and descending locking pins at its lower end for engaging said guide blocks of said mask holders, said engaged ascending and descending mask holders supporting a stack of mask holders on said ascending and descending guide rods, respectively, whereby disengaging said descending locking pin from said lowermost mask holder causes said stack of descending mask holders to ratchet downward by gravity assistance, and whereby bottom loading said stack of ascending mask holders causes said stack of ascending mask holders to ratchet upward;

an up and down reciprocating lower transfer turret supported on the lower end of said support column and linked to a rotating index drive mechanism for rotating said lower turret about its central axis, said lower turret having four sets of vertical holding rods diametrically opposed for engaging said sleeves on said mask holders and for aligning with the lower ends of said ascending and descending guide rods, and also having an elevator block for riding on said holding rods, said elevator block being linked to a reciprocating drive mechanism for moving said elevator block up and down a predetermined distance, said reciprocating drive mechanism also being linked to said descending locking pin on said support column, wherein said raising of said elevator block causes said descending locking pin to disengage the guide block of the lowest mask holder on said descending guide rods, said lowermost mask holder thereby dropping down onto a first set of said holding rods as said elevator block is lowered thereby causing said stack of descending mask holders to ratchet downward by gravity assistance, simultaneous, said raising of said elevator block causes a first mask holder to move up off of a second set of said holding rods and onto the bottom of said ascending guide rods, thereby causing said stack of ascending mask holders to ratchet upward, said ascending locking pin engaging said guide block of said first mask holder, preventing said first mask holder from moving down off said ascending guide rods as said elevator block is lowered, and also wherein said elevator block being in its lowered position, said lower turret is rotated to a predetermined position between said ascending and descending guide rods to allow a mask to be placed upon and/or removed from a platen of a mask holder;

an upper transfer turret supported on the upper end of said support column and linked to said rotating index drive mechanism for rotating said upper turret about its central axis, said upper turret having four sets of vertical holding rods diametrically opposed for engaging said sleeves on said mask holders and for aligning with the upper ends of said ascending and descending guide rods, said upper turret also having a holding pin for each set of said upper holding rods for engaging said guide blocks on said mask holders, wherein said ratcheting upward of said stack of ascending mask holders causes said uppermost mask holder to move off of said ascending guide rods and onto a first set of said upper holding rods, a corresponding first holding pin engaging said guide block of said uppermost mask holder and preventing said uppermost mask holder from dropping downward, and wherein said ratcheting downward of said stack of descending mask holders causes a second holding pin to disengage the guide block of a second mask holder above said stack of descending mask holders causing said second mask holder to move downward off of a second set of upper holding rods and onto said top end of said descending guide rods, and also wherein said rotating of said upper turret causes said mask holders to be rotated from a position above the upper end of said ascending guide rods to an intermediate position between said ascending and descending guide rods, and then to a position above the upper end of said descending guide rods;

whereby said rotating of said rotating index drive mechanism and said up and down movement of said reciprocating drive mechanism causes said mask holders to follow a cycle of being bottom loaded onto said ascending guide rods, ratcheted upward, rotated to said descending rods, top loaded onto said descending guide rods, ratcheted downward, removed from the bottom of said stack of descending mask holders, rotated to a predetermined load/unload position and rotated to the bottom of said ascending guide rods;

whereby said apparatus insures in a foolproof way that a one-to-one relationship is retained between said faceplates and said shadow masks when said faceplates are separated from said shadow masks and insured that excessive handling of and the possibility of damage to said shadow masks is prevented.

* * * * *

UNITED STATES PATENT OFFICE

CERTIFICATE OF CORRECTION

Patent No. 4,120,407 Dated October 17, 1978

Inventor(s) Leslie l. Baur and Thaddeus J. Hajduk

It is certified that error appears in the above-identified patent and that said Letters Patent are hereby corrected as shown below:

Column 1, line 50, delete "dispositied" and insert --deposited--;

Column 2, line 26, delete "delicated" and insert --delicate--;

Column 6, line 54, delete "mash" and insert --mask--; and,

Column 7, line 5, insert after "ascending" --guide--.

Signed and Sealed this

*Sixteenth* Day of *January 1979*

[SEAL]

*Attest:*

RUTH C. MASON
*Attesting Officer*

DONALD W. BANNER
*Commissioner of Patents and Trademarks*